United States Patent
Hong et al.

(10) Patent No.: US 11,467,047 B2
(45) Date of Patent: Oct. 11, 2022

(54) FORCE SENSING DEVICE WITH COMMON NOISE REDUCTION AND ELECTRONIC DEVICE

(71) Applicant: Samsung Electro-Mechanics Co., Ltd., Suwon-si (KR)

(72) Inventors: Byung Joo Hong, Suwon-si (KR); Joo Yul Ko, Suwon-si (KR); Je Hyuk Ryu, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 152 days.

(21) Appl. No.: 16/885,479

(22) Filed: May 28, 2020

(65) Prior Publication Data
US 2021/0231509 A1 Jul. 29, 2021

(30) Foreign Application Priority Data
Jan. 29, 2020 (KR) ........................ 10-2020-0010666

(51) Int. Cl.
*G01L 1/14* (2006.01)
*G06F 3/041* (2006.01)

(52) U.S. Cl.
CPC .............. *G01L 1/14* (2013.01); *G06F 3/0414* (2013.01)

(58) Field of Classification Search
CPC ......... G01L 1/14; G06F 3/0414; G06F 3/044; G06F 2203/04105; G06F 3/04182; G06F 3/046
See application file for complete search history.

(56) References Cited

U.S. PATENT DOCUMENTS

| 2011/0096008 A1* | 4/2011 | Furukawa ............. G06F 3/0338 345/173 |
| 2012/0313627 A1* | 12/2012 | Furukawa ............. G06F 3/0338 324/207.15 |
| 2013/0057097 A1 | 3/2013 | Choi |
| 2015/0130649 A1 | 5/2015 | Itakura et al. |
| 2018/0093695 A1 | 4/2018 | Hattori et al. |

(Continued)

FOREIGN PATENT DOCUMENTS

| JP | 2012-168747 A | 9/2012 |
| JP | 2015-095865 A | 5/2015 |

(Continued)

*Primary Examiner* — Temesghen Ghebretinsae
*Assistant Examiner* — Ivelisse Martinez Quiles
(74) *Attorney, Agent, or Firm* — NSIP Law

(57) ABSTRACT

A force sensing device includes: a substrate disposed inside a housing and spaced apart from inner side surfaces of a first force member and a second force member; a first inductor element mounted on a first surface of the substrate and spaced apart from the first force member, the first inductor element having a first inductance, variable at a time of force input pressing the first force member; a second inductor element mounted on the first surface of the substrate and spaced apart from the second force member, the second inductor element having a second inductance, variable at a time of force input; and a support member having one end contacting the first surface of the substrate between the first inductor element and the second inductor element and another end contacting an inner side surface of the housing between the first force member and the second force member.

17 Claims, 10 Drawing Sheets

(56) References Cited

U.S. PATENT DOCUMENTS

2018/0120364 A1      5/2018   Lee et al.
2020/0379603 A1*   12/2020   Lee ........................ G06F 3/0416
2021/0157424 A1*    5/2021   Lee ......................... G06F 3/041

FOREIGN PATENT DOCUMENTS

| KR | 10-2002-0077836 A | 10/2002 |
| KR | 10-2009-0120709 A | 11/2009 |
| KR | 10-2011-0087004 A | 2/2011 |
| KR | 10-2011-0087014 A | 8/2011 |
| KR | 10-2011-0099518 A | 9/2011 |
| KR | 10-2018-0046833 A | 5/2018 |

* cited by examiner

FORCE SENSING DEVICE WITH COMMON NOISE REDUCTION AND ELECTRONIC DEVICE

CROSS-REFERENCE TO RELATED APPLICATION(S)

This application claims the benefit under 35 USC 119(a) of Korean Patent Application No. 10-2020-0010666 filed on Jan. 29, 2020 in the Korean Intellectual Property Office, the entire disclosure of which is incorporated herein by reference for all purposes.

BACKGROUND

1. Field

The following description relates to a force sensing device with a common noise reduction function and an electrical device.

2. Description of Background

In general, wearable devices are favored to have a thinner, simpler, and cleaner design, and accordingly, existing mechanical switches are disappearing, made possible as dustproof, waterproof technologies are implemented, and a model with a unified seamless design has been developed.

Currently, technologies such as a touch on metal (ToM) technology that touches on metal, a micro-electro-mechanical-system (MEMS), micro strain gauge, and the like are being developed. Furthermore, a force touch function is also being developed.

In the case of a conventional mechanical switch, there is a disadvantage in which a large size and space is required internally to implement a switch function, and also a neat design and a large space are required due to an appearance protruding to an outside or a structure that is not integrated with an external case.

In addition, there is a risk of electric shock due to a direct contact of the mechanical switch that is electrically connected, and in particular, there is a disadvantage in which dust-proofing and waterproofing are difficult due to the structure of the mechanical switch.

In conventional switch devices, noise or interference may occur due to external environmental factors, and thus, a solution to such noise or interference is required.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a force sensing device including two force members, when force is applied to any one of the two force members, a force sensing device and an electronic device capable of performing force sensing more accurately, by causing a frequency of a signal by the force member to which force is applied to change in a direction opposite to a frequency of a signal by a force member to which force is not applied.

In one general aspect, in a force sensing device that can be applied to an electrical device including a force switch unit having a first force member and a second force member formed in a conductive housing, a force sensing device is disposed. The force sensing device includes: a substrate disposed inside the housing and spaced apart from inner side surfaces of the first force member and the second force member; a first inductor element disposed on a first surface of the substrate and spaced apart from the first force member, the first inductor element having a first inductance, which is variable at a time of force input pressing the first force member; a second inductor element disposed on the first surface of the substrate and spaced apart from the second force member, the second inductor element having a second inductance, which variable at a time of force input pressing the second force member; and a support member including a first end contacting the first surface of the substrate at a location between the first inductor element and the second inductor element and a second end contacting an inner side surface of the housing at a location between the first force member and the second force member.

In another general aspect, an electronic device includes: a conductive housing; a force switch unit including a first member and a second force member formed on the housing; a substrate disposed inside the housing and spaced apart from inner side surfaces of the first force member and the second force member; a first inductor element disposed on a first surface of the substrate and spaced apart from the first force member, the first inductor element having a first inductance, which is variable at a time of force input pressing the first force member; a second inductor element disposed on the first surface of the substrate and spaced apart from the second force member, the second inductor element having a second inductance, which variable at a time of force input pressing the second force member; and a support member including a first end contacting the first surface of the substrate at a location between the first inductor element and the second inductor element and a second end contacting an inner side surface of the housing at a location between the first force member and the second force member.

When force is input to any one of the first force member and the second force member, the first force member and the second force member may move in opposite directions.

The force sensing device/electronic device may include a first oscillation circuit configured to generate a first oscillation signal having a first resonance frequency based on the first inductance and a second oscillation circuit configured to generate a second oscillation signal having a second resonance frequency based on the second inductance.

The first resonance frequency may be higher than the second resonance frequency when force is applied to the first force member, and the second resonance frequency may be higher than the first resonance frequency when force is applied to the second force member.

The force sensing device/electronic device may include a detection circuit configured to: convert the first oscillation signal into a digital value to generate a first count value and the second oscillation signal into a digital value to generate a second count value, subtract the first count value and the second count value to obtain a difference value, and detect a force position based on the difference value to generate a detection signal.

The detection circuit may include a first frequency-digital converter configured to convert the first oscillation signal into the digital value to generate the first count value; a second frequency-digital converter configured to convert the second oscillation signal into the digital value to generate the second count value; and a force detection circuit configured to obtain the difference value by subtracting the first count value and the second count value, and to detect the force position based on the difference value to generate the detection signal.

The force detection signal may include a subtractor configured to subtract the first count value and the second count value to obtain the difference value; a first comparator configured to compare the difference value with a first reference value; and a second comparator configured to compare the difference value with a second reference value.

The force sensing device/electronic device may include a bracket supporting the substrate on a second surface of the substrate opposite the first surface to maintain a first distance between the first inductor element and the first force member and a second distance between the second inductor element and the second force member, in a state in which force is not applied to either the first force member or the second force member.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
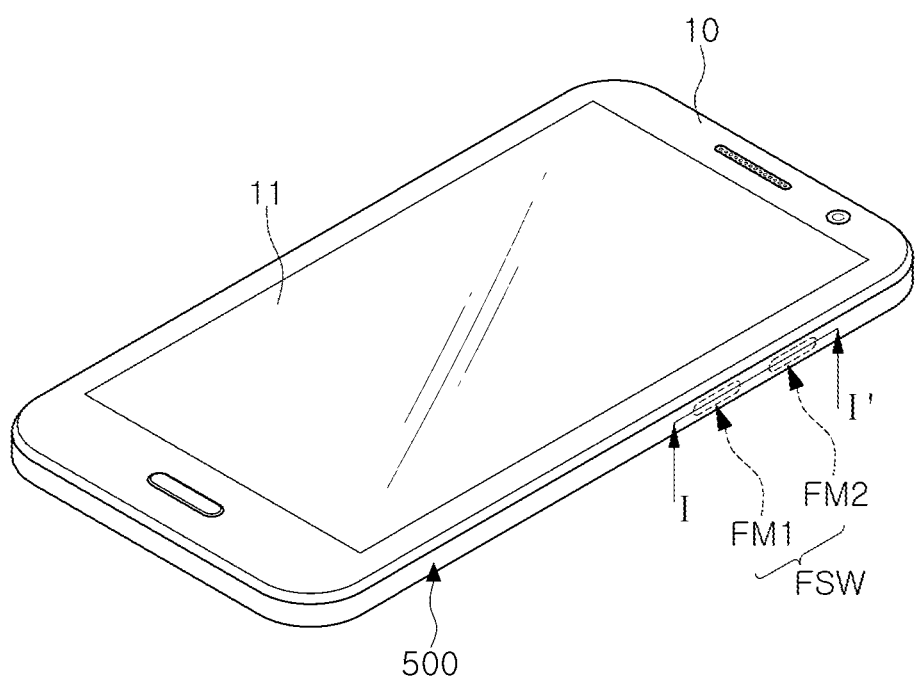
FIG. 1 is an appearance exemplary diagram of an electronic device according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a diagram of an electronic device according to an example.

Referring to FIG. 1, an electronic device 10 may include a touch screen 11, a housing 500, and a force switch unit FSW.

The force switch unit FS2 may include a first force member FM1 and a second force member FM2 for replacing a mechanical button.

For example, referring to FIG. 1, the electronic device 10 may be a portable device such as a smartphone, or the like, a wearable device such as a smart watch, and may be a portable or wearable electronic device, or an electronic device having a switch for operation control without being limited to a specific deice.

The housing 500 may be an external case exposed to an outside of the electronic device 10. For example, when the force sensing device is applied to a mobile device, the housing 500 may be a cover disposed on a side (side surface) of the mobile device. For example, the housing 500 may be integrally formed with a cover disposed on a rear surface of the electronic device 10, or may be separately formed on the cover on the rear surface of the electronic device 10.

The force switch unit FSW may include at least two first force members FM1 and second force members FM2, to sense force to which force is applied, such that the force switch unit FSW may be integrally formed with the housing 500 of the electronic device. Referring to FIG. 1, the force switch unit FSW may be disposed on a cover of the electronic device 10, but in this case, the cover may be a cover except for a touch screen, for example, a side cover, a rear-surface cover, a cover formed on a portion of a front surface, or the like. For convenience of description, as an example of the housing 500, a case of being disposed on the side cover of the electronic device 10 is described, but the configuration is not limited thereto.

For each of the drawings, unnecessary redundant descriptions of the same reference numerals and components of the same function may be omitted, and details of possible differences may be described for each of the drawings.

Figure 2:
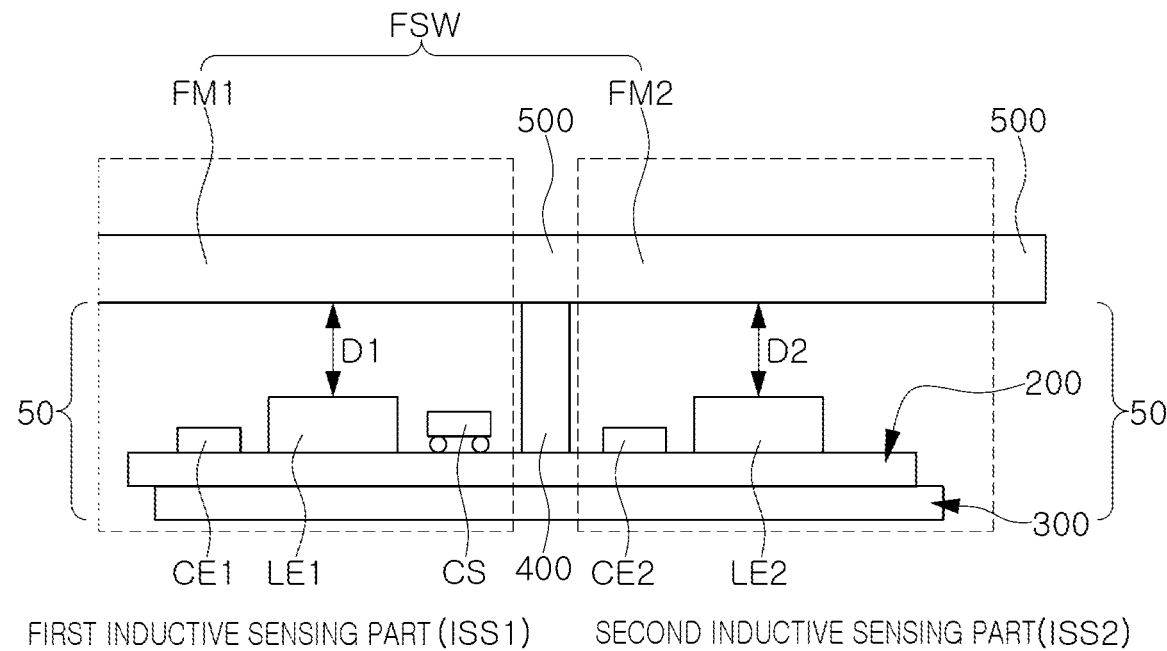
FIG. 2 is a diagram of an electronic device and a force sensing device having a cross-sectional structure taken along line I-I' of FIG. 1.

FIG. 2 is a diagram of an electronic device and a force sensing device having a cross-sectional structure taken along line I-I' of FIG. 1.

Referring to FIGS. 1 and 2, the electronic device 10 may include the force switch unit FSW having the first force member FM1 and the second force member FM2 formed in the conductive housing 500, and a force sensing device 50 disposed inside the housing 500.

The force sensing device 50 may include a substrate 200, a first inductor element LE1, a second inductor element LE2, and a support member 400.

The substrate 200 is disposed inside the housing 500, and is spaced apart from inner side surfaces of the first force member FM1 and the second force member FM2.

The first inductor element LE1 is mounted on one surface of the substrate 200, is spaced apart from the first force member FM1, and has an inductance, variable at a time of force input, pressing the first force member FM1.

The second inductor element LE2 is mounted on one surface of the substrate 200, is spaced apart from the second force member FM2, and has an inductance, variable at a time of force input, pressing the second force member FM2.

The support member 400 may include one end attached to one surface of the substrate 200 between the first inductor element LE1 and the second inductor element LE2, and the other end attached to the inner side surface of the housing 500 between the first force member FM1 and the second force member FM2.

When force is input to any one of the first force member FM1 and the second force member FM2, the first force member FM1 and the second force member FM2 move in opposite directions by virtue of the support member 400.

As shown in FIG. 2, the force sensing device 50 may include a bracket 300 and a circuit unit CS.

On the substrate 200, a first capacitor element CE1 electrically connected to the first inductor element LE1 in parallel and a second capacitor element CE2 electrically connected to the second inductor element LE2 in parallel may be mounted, and the circuit unit CS including an oscillation circuit 600 and a detection circuit 700 (see FIG. 5, for example) may be mounted.

The bracket 300 may support the substrate 200 to maintain a first distance D1 between the first inductor element LE1 and the first force member FM1 and a second distance D2 between the second inductor element LE2 and the second force member FM2, in a state in which force is not applied.

Referring to FIG. 2, the circuit unit CS may be mounted on any one position of one surface of the substrate 200, but the mounting position is not limited thereto.

Referring to FIG. 2, the electronic device may include a first inductive sensing part ISS1 and a second inductive sensing part ISS2.

The first inductive sensing part ISS1 may include the first force member FM1 formed on the housing 500 of the electronic device, the first inductor element LE1 disposed inside the first force member FM1, and spaced apart from the first force member FM1 by the first distance D1, the first inductor element LE1 having an inductance variable at the time of force input through the first force member FM1, the first capacitor element CE1 connected in parallel to the first inductor element LE1, and the circuit unit CS (e.g., an integrated circuit (IC)) generating a first oscillation signal having a resonance frequency variable based on the first inductor element LE1, and recognizing a first force input based on the first oscillation signal.

The second inductive sensing part ISS2 may include the second force member FM2 formed on the housing 500 of the electronic device, the second inductor element LE2 disposed inside the second force member FM2, and spaced apart from the second force member FM2 by the second distance D2, the second inductor element LE2 having an inductance variable at the time of force input through the second force member FM2, the second capacitor element CE2 connected in parallel to the second inductor element LE2, and the circuit unit CS generating a second oscillation signal having a resonance frequency variable based on the second inductor element LE2, and recognizing a second force input based on the second oscillation signal.

The circuit unit CS may be commonly included in the first inductive sensing part ISS1 and the second inductive sensing part ISS2. The first distance D1 between the first force member FM1 and the first inductor element LE1 may be the same as the second distance D2 between the second force member FM2 and the second inductor element LE2, and may be different, not substantially the same, in implementation.

Regarding the first inductive sensing part ISS1 shown in FIG. 2, the first inductor element LE1 spaced apart from the inner side surface of the first force member FM1 by a predetermined distance may be mounted on one surface of the substrate 200, and the first capacitor element CE1 and the circuit unit CS (e.g., IC) may be mounted on one surface of the substrate 200. The bracket 300 may be attached to the other surface of the substrate 200.

The bracket 300 may be a conductor such as a metal, may be attached to an internal structure of an electronic device to which a force sensing device is applied, and may be supported by using a separate support member. The bracket 300 is not limited to a special structure as long as the first inductor element LE1 and the first force member FM1 maintain the first distance D1 (see FIG. 2).

The circuit unit CS (e.g., IC), the first inductor element LE1, and the first capacitor element CE1 may be disposed on one surface of the substrate 200, and the circuit unit CS (e.g., IC), the first inductor element LE1, and the first capacitor element CE1 may be electrically connected through the substrate 200.

Regarding the second inductive sensing part ISS2 shown in FIG. 2, the second inductor element LE2 spaced apart from the inner side surface of the second force member FM2 by a predetermined distance may be mounted on one surface of the substrate 200, and the second capacitor element CE2 may also be mounted on one surface of the substrate 200. The bracket 300 may be attached to the other surface of the substrate 200 opposite the second inductive sensing part ISS2.

The bracket 300 may be a conductor such as a metal, may be attached to an internal structure of an electronic device to which a force sensing device is applied, and may be supported by using a separate support member. The bracket 300 is not limited to one special structure as long as the second inductor element LE2 and the second force member FM2 maintain the second distance D2 (see FIG. 2).

The second inductor element LE2 and the second capacitor element CE2 may be mounted on one surface of the substrate 200, and the circuit unit CS (e.g., IC), the second inductor element LE2, and the second capacitor element CE2 may be electrically connected through the substrate 200.

As described above, the first inductive sensing part ISS1 and the second inductive sensing part ISS2 are merely examples, but the configurations are not limited thereto.

Figure 3:
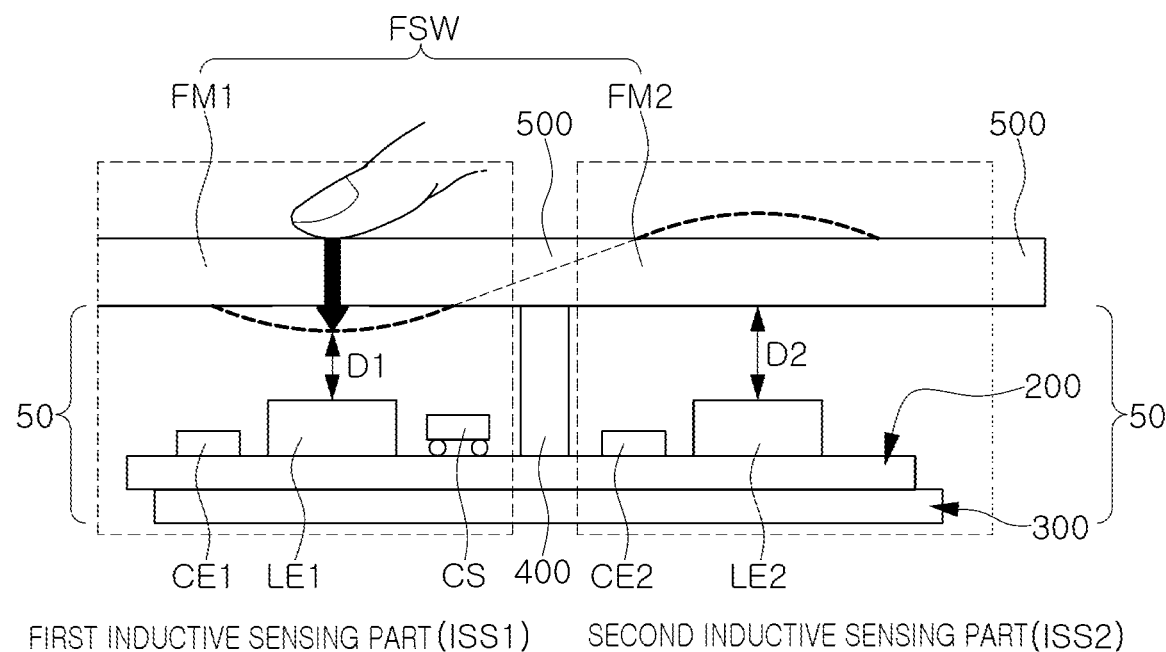
FIG. 3 is an explanatory view of a spacing distance when a force is applied to the first force member of FIG. 2.

Referring to FIGS. 2 and 3, in the first inductive sensing part ISS1, the first force member FM1 may be integrally formed with the housing 500, and may be made of, for example, aluminum or metal. The first inductor element LE1 may be disposed to be spaced apart from the first force member FM1 by the bracket 300, by the first distance D1 (see FIG. 2). A ferrite sheet (not shown) may be disposed on a lower surface of the first inductor element LE1, but is not required, and it may be configured as a flexible PCB (FPCB) by a PCB itself. In addition, it can also be replaced with a chip inductor.

In addition, the substrate 200 (e.g., FPCB) on which the first inductor element LE1 (e.g., PCB coil) and the first capacitor element CE1 (e.g., MLCC) is disposed may be mounted on the bracket 300 to be coupled to the housing 500, and accordingly, a distance between the first inductor element LE1 and the first force member FM1 may be maintained by a predetermined first distance D1 (see FIG. 2) by the bracket 300.

By the first inductive sensing part ISS1, when the first force member FM1 of the housing 500 is pressed by force, the first distance D1 between the first force member FM1 and the first inductor element LE2 is narrowed (shortened) and the inductance is changed by the pressing of the first force member FM1. Accordingly, the first force input may be sensed by the oscillation circuit 600 and the detection circuit 700. In this case, the second distance D2 may be widened (lengthened), opposite to the first distance D1.

Referring to FIGS. 2 and 3, in the second inductive sensing part ISS2, the second force member FM2 may be integrally formed with the housing 500, and may be made of, for example, aluminum or metal. The second inductor element LE2 may be disposed to be spaced apart from the second force member FM2 by the bracket 300 by the second distance D2 (see FIG. 2). A ferrite sheet (not shown) may be disposed on a lower surface of the second inductor element LE2, but is not required. The shape of the second inductor element LE2 does not need to be specifically defined, and various patterns such as circles, squares, or the like, are possible, and it may be configured as a flexible PCB (FPCB) by a PCB itself. In addition, it can also be replaced with a chip inductor.

The substrate 200 on which the second inductor element LE2 (e.g., PCB coil), and the second capacitor element CE2 (e.g., MLCC) are disposed may be mounted on the bracket 300 and coupled to the housing 500, and accordingly, a distance between the second inductor element LE2 and the second force member FM2 may be maintained by the bracket 300 by the second distance D2 (see FIG. 2).

By the second inductive sensing part ISS2, when the second force member FM2 of the housing 500 is pressed by force, the second distance D2 between the second force member FM2 and the second inductor element LE2 is narrowed (shortened) and the inductance is changed by the pressing of the second force member FM2. Accordingly, the second force input may be sensed by the oscillation circuit 600 and the detection circuit 700. In this case, the first distance D1 may be widened (lengthened), opposite to the second distance D2.

Using two force sensing structures according to the example as shown in FIGS. 2 and 3, in the force sensing structure having different force members adjacent to each other, the force applied position may be distinguished and detected more accurately.

In the various examples, by force of a conductor such as human hands or a nonconductor such as plastic to press the first force member and the second force member of the housing, force input means a case in which a distance between the first force member and the first inductor element is changed and a distance between the second force member and the second inductor element is changed. It means the case in which the resonance frequency changes by a change in the inductance due to such a change in distance.

FIG. 3 is an explanatory view of a separation distance when force is applied to the first force member of FIG. 2.

Referring to FIG. 3, when force is applied to the first force member FM1, the first distance D1 between the first force member FM1 and the first inductor element LE1 may be narrowed, and a second distance D2 between the second force member FM2 and the second inductor element LE2 may be widened by virtue of the support member 400.

Figure 4:
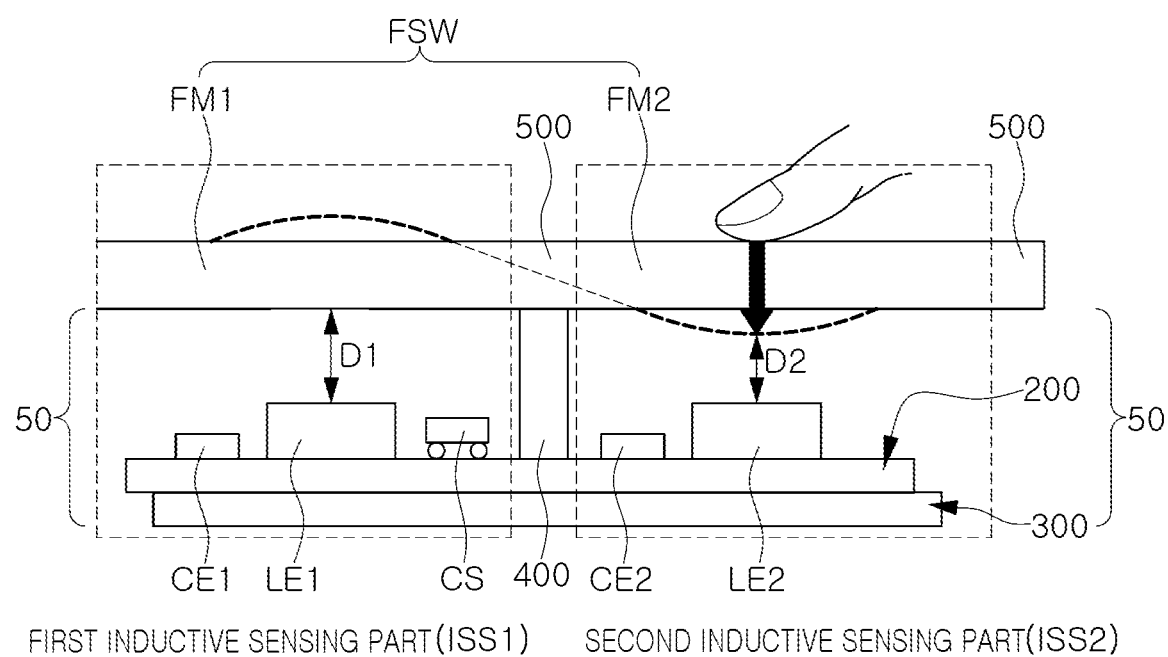
FIG. 4 is an explanatory view of a spacing distance when a force is applied to the first force member of FIG. 2.

FIG. 4 is an explanatory view of a separation distance when force is applied to the first force member of FIG. 2.

Referring to FIG. 4, when force is applied to the second force member FM2, the first distance D1 between the first force member FM1 and the first inductor element LE1 may be widened, and the second distance D2 between the second force member FM2 and the second inductor element LE2 may be narrowed by virtue of the support member 400.

Referring to FIGS. 3 and 4, when force is applied to the first force member FM1, the first distance D1 may be narrowed, and when there is no the support member 400, the second distance D2 may also be narrowed.

In contrast thereto, in the various examples, since there is the support member 400, when the first distance D1 is narrowed, the second distance D2 may be conversely widened, and in addition, when the second distance D2 is narrowed, the first distance D1 may be conversely widened.

Figure 5:
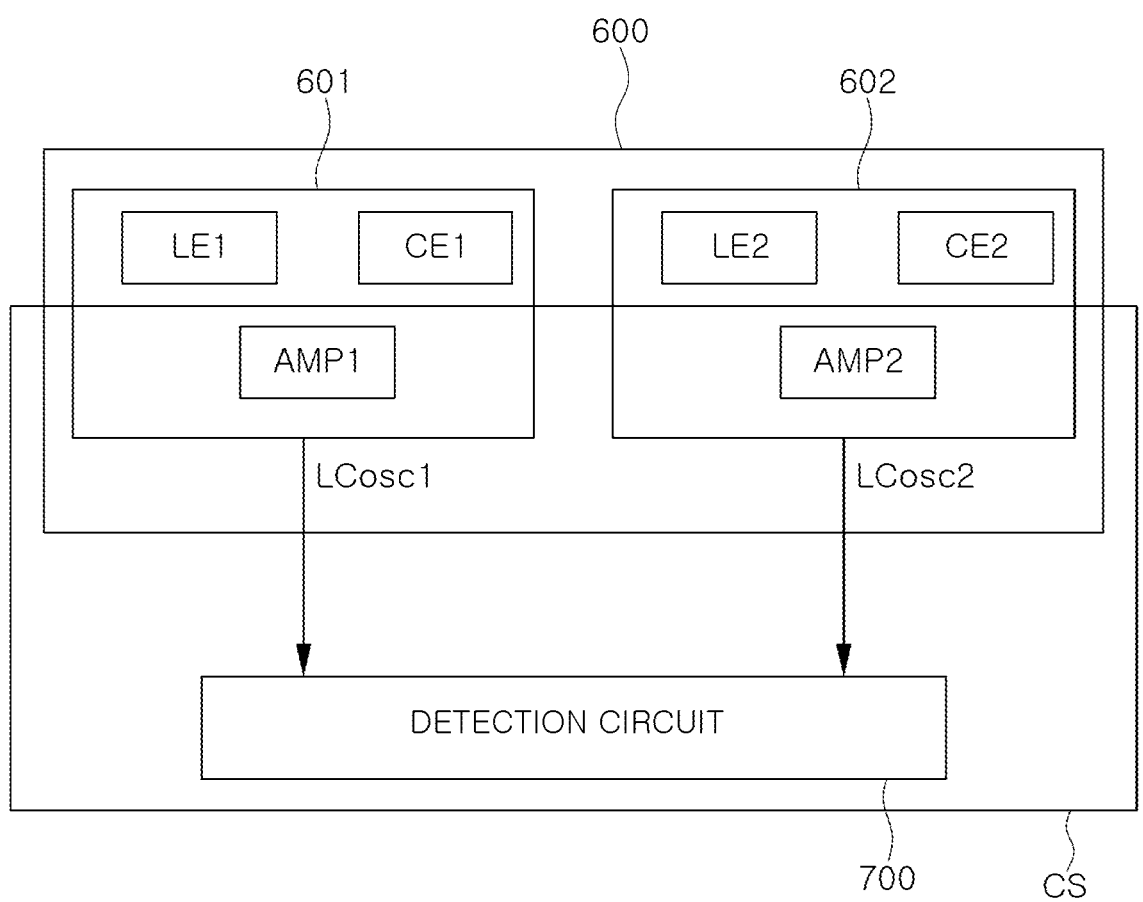
FIG. 5 is a diagram of an oscillation circuit and a detection circuit according to an example.

FIG. 5 is an exemplary diagram of an oscillation circuit and a detection circuit.

Referring to FIG. 5, a force sensing device 50 (see FIG. 2) may include an oscillation circuit 600 and a detection circuit 700.

The oscillation circuit 600 may include a first oscillation circuit 601 and a second oscillation circuit 602. The first oscillation circuit 601 may include the first inductor element LE1, the first capacitor element CE1 connected in parallel to the first inductor element LE1, and a first amplifier Amp1, and may generate a first oscillation signal LCosc1 having a resonant frequency based on the inductance of the first inductor element LE1.

The second oscillation circuit 602 may include the second inductor element LE2, the second capacitor element CE2 connected in parallel to the second inductor element LE2, and a second amplifier Amp2, and may generate a second oscillation signal LCosc2 having a resonance frequency based on the inductance of the second inductor element LE2.

The oscillation circuit 600 may generate a first oscillation signal LCosc1 having a higher resonance frequency when force is applied to the first force member FM1, and a second oscillation signal LCosc2 having a lower resonance frequency. The oscillation circuit 600 may generate a second oscillation signal LCosc2 having a higher resonance frequency when force is applied to the second force member FM2, and may generate a first oscillation signal LCosc1 having a lower resonance frequency.

The detection circuit 700 may convert each of the first oscillation signal LCosc1 and the second oscillation signal LCosc2 into a digital value to generate a first count value L_CNT1 and a second count value L_CNT2 (for example, see FIG. 7), and may subtract the first count value L_CNT1 and the second count value L_CNT2 to obtain a difference value Diff, and detect a force position based on the difference value Diff to generate a detection signal.

Figure 6:
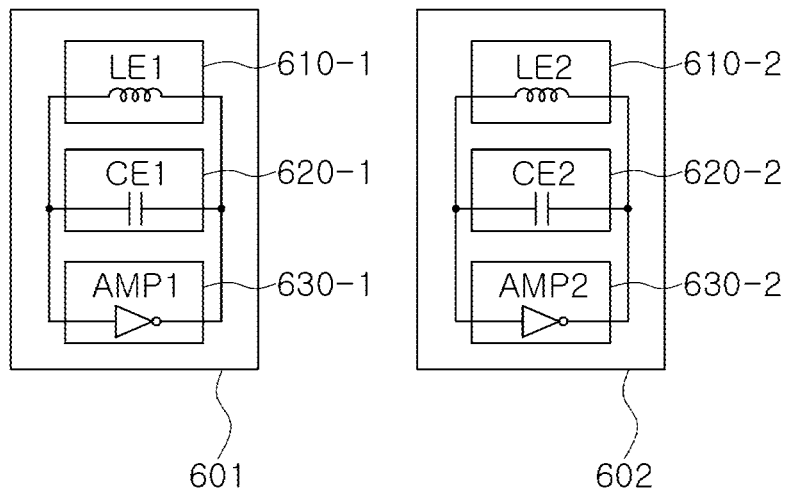
FIG. 6 is a diagram of an inner circuit diagram of an oscillation circuit according to an example.

FIG. 6 is an internal circuit exemplary diagram of an oscillation circuit.

Referring to FIG. 6, the first oscillation circuit 601 may include a first inductance circuit 610-1, a first capacitance circuit 620-1, and a first amplifier circuit 630-1.

The first inductance circuit 610-1 may include a first inductor element LE1 disposed to be spaced apart from an inner surface of the first force member FM1 by a first distance D1, and may include an inductance variable based on the force input through the first force member FM1.

The first capacitance circuit 620-1 may include a first capacitor element CE2 connected to the first inductance circuit 610-1, and may include a capacitance.

The first amplifier circuit 630-1 may include a first amplifier Amp1, and may generate a first oscillation signal LCosc1 having a first resonance frequency fres1 by the first inductance circuit 610-1 and the first capacitance circuit 620-1.

The second oscillation circuit 602 may include a second inductance circuit 610-2, a second capacitance circuit 620-2, and a second amplifier circuit 630-2.

The second inductance circuit 610-2 may include a first inductor element LE1 disposed to be spaced apart from the inner surface of the second force member FM2 by a second distance D2, and may include an inductance variable based on the force input through the second force member FM2.

The second capacitance circuit 620-2 may include a second capacitor element CE2 connected to the second inductance circuit 610-2, and may include capacitance.

The second amplifier circuit 630-2 may include a second amplifier Amp2, and may generate a second oscillation signal LCosc2 having a second resonance frequency fres2 caused by the second inductance circuit 610-2 and the second capacitance circuit 620-2.

Referring to FIG. 6, an operation of the first oscillation circuit 601 in the case where force is applied to the first force member FM1 will be described.

For example, the first resonant frequency fres1 of the first oscillation circuit 601 may be expressed by Equation 1 below. In addition, the second resonant frequency fres2 of the second oscillation circuit 602 may be expressed by Equation 2 below.

$$fres1 \approx 1/2\pi sqrt(Lind*Cext) \qquad \text{Equation 1:}$$

$$fres2 \approx 1/2\pi sqrt(Lind*Cext) \qquad \text{Equation 2:}$$

In Equations 1 and 2 above, means that they may be the same or similar, where similar means that other values may be further included.

In addition, referring to FIG. 6, when force (pressure) for pressing a contact surface of the first force member FM1 of the housing 500 of the electronic device is applied, force input may be detected.

For example, when force (pressure) is applied to the first force member FM1, the first force member FM1 is pressed and bent inwardly and the first distance D1 between the first force member FM1 and the first inductor LE1 may be changed, while a current flows through the first inductor element LE1, the first distance D1 from the first force member FM1, which is a surrounding conductor, may be changed to change a magnitude of an eddy current. An inductance caused by the magnitude of the eddy current may decrease (Lind−ΔLind) to increase the first resonant frequency fres1, thereby detecting a first force input.

In addition, using an operating principle as described above, when the force is applied to the second force member FM2, the force input can be detected.

For example, when force (pressure) is applied to the second force member FM2, the second force member FM2 is pressed and bent inwardly and the second distance D2 between the second force member FM2 and the second inductor LE2 may be changed, while a current flows through the second inductor element LE2, the second distance D2 from the second force member FM2, which is a surrounding conductor, may be changed to change a magnitude of an eddy current. An inductance caused by the magnitude of the eddy current may decrease (Lind−ΔLind) to increase the second resonant frequency fres2, thereby detecting a second force input.

Figure 7:
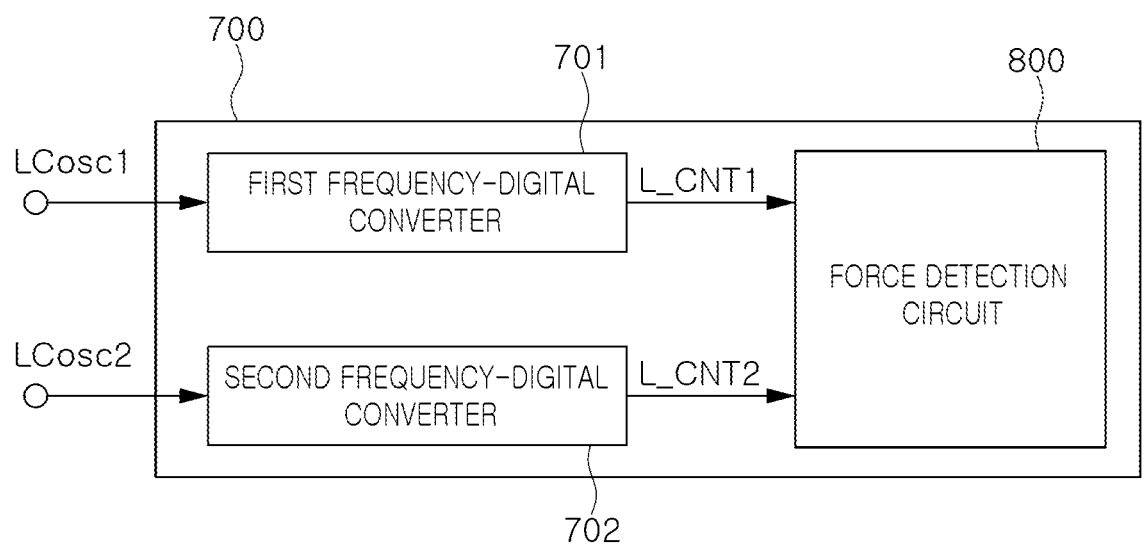
FIG. 7 is a diagram of an inner configuration of a circuit diagram of a detection circuit according to an example.

FIG. 7 is an internal configuration exemplary diagram of a detection circuit.

Referring to FIG. 7, the detection circuit 700 may include a first frequency-digital converter 701, a second frequency-digital converter 702, and a force detection circuit 800.

The first frequency-digital converter 701 may convert the first oscillation signal Lcosc1 into a digital value to generate a first count value L_CNT1.

The second frequency-digital converter 702 may convert the second oscillation signal LCosc2 into a digital value to generate a second count value L_CNT2.

The force detection circuit 800 may generate a detection signal by subtracting the first count value L_CNT1 and the second count value L_CNT2 to obtain a difference value Diff, and detect a force position based on the difference value Diff.

Figure 8:
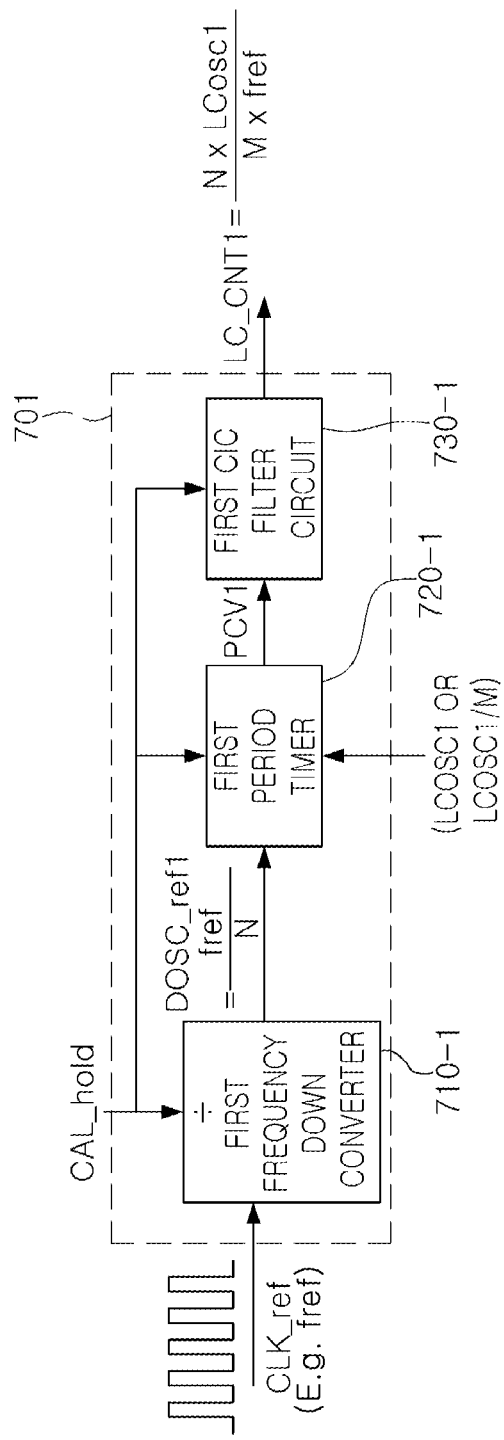
FIG. 8 is a diagram of the first frequency-digital converter of FIG. 7.

FIG. 8 is a diagram of the first frequency-digital converter 701 of FIG. 7.

Referring to FIG. 8, a first frequency-digital converter 701 may count a reference clock signal CLK_ref (fref) by using a first oscillation signal LCosc1 to generate a first count value L_CNT1.

For example, the first frequency-to-digital converter (FDC1) 701 may include a first frequency down converter 710-1, a first period timer 720-1, and a first cascaded integrator-comb (CIC) filter circuit 730-1.

The first frequency down converter 710-1 receives a reference clock signal CLK_ref that is a reference for a time period of a timer to be counted, and then lowers the frequency of the reference clock signal CLK_ref.

The first period timer 720-1 counts one cycle time of the divided reference clock signal DOSC_ref1 received from the first frequency down converter 710-1 using the first oscillation signal LCosc1 to generate a first period count value PCV1.

The first CIC filter circuit 730-1 may output the first count value L_CNT1 by amplifying the input first period count value PCV1 using a cumulative gain.

For example, when the first CIC filter circuit 730-1 includes an integrating circuit, a decimator, and a differential circuit, the cumulative gain may be obtained as [(R*M)^S] based on a stage order S of the integrating circuit, the decimator factor R, and a derivative delay order M of a differential circuit. For example, when the stage order S of the integrating circuit is 4, the decimator factor R is 1, and the derivative delay order M of the differential circuit is 4, the cumulative gain may be 256[(1*4)^4].

Figure 9:
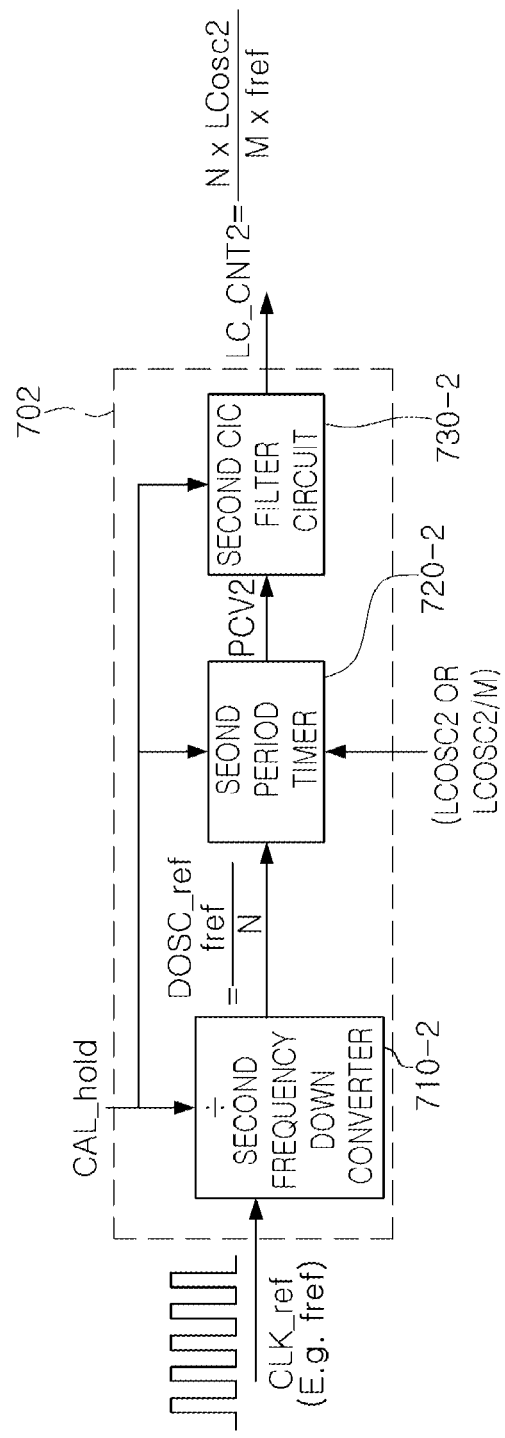
FIG. 9 is a diagram of the second frequency-digital converter of FIG. 7.

FIG. 9 is an exemplary diagram of a second frequency-digital converter 702 of FIG. 7.

Referring to FIG. 9, the second frequency-to-digital converter 702 may count the reference clock signal CLK_ref (fref) using the second oscillation signal LCosc2 to generate a second count value L_CNT2.

For example, the second frequency-to-digital converter (FDC2) 702 may include a second frequency down converter 710-2, a second period timer 720-2, and a second cascaded integrator-comb (CIC) filter circuit 730-2.

The second frequency down converter 710-2 receives a reference clock signal CLK_ref that is a reference for a time period of a timer to be counted, and then lowers the frequency of the reference clock signal CLK_ref.

The second period timer 720-2 may count one cycle of time of the divided reference clock signal DOSC_ref received from the second frequency down converter 710-2 by using the second oscillation signal LCosc2 to generate a second period count value PCV2.

The second CIC filter circuit 730-2 may output a second count value L_CNT2 by amplifying the input second period count value PCV2 using a cumulative gain.

For example, when the second CIC filter circuit 730-2 includes an integrating circuit, a decimator, and a differential circuit, the cumulative gain may be obtained as [(R*M)^S] based on a stage order S of the integrating circuit, the decimator factor R, and a derivative delay order M of a differential circuit. For example, when the stage order S of the integrating circuit is 4, the decimator factor R is 1 and the derivative delay order M of the differential circuit is 4, the cumulative gain may be 256[(1*4)^4].

The first frequency-to-digital converter 701 as described above may count the reference clock signal CLK_ref (fref) using the first oscillation signal LCosc1 to generate the first count value L_CNT1.

For example, as shown in Equation 3 below, the first frequency-digital converter 701 may divide the reference clock signal fref by the reference frequency division ratio N, and may divide the first oscillation signal LCosc1 by the frequency division ratio M to count the divided reference signal fref/N using the divided first oscillation signal LCosc1/M. Here, the first oscillation signal LCosc1 may not be divided by a sensing frequency division ratio M.

$$L\_CNT1 = (N*LCosc1)/(M*fref) \quad \text{Equation 3:}$$

In Equation 3, LCosc1 may be a frequency of the first oscillation signal (first oscillation frequency), fref is a frequency of a reference clock signal, N is a reference frequency (e.g., 32 Khz) division ratio, and M is a division ratio of an oscillation signal.

As shown in Equation 3, dividing the first oscillation frequency LCosc1 by the reference frequency fref means that a period of the reference frequency fref is counted using the first oscillation frequency LCosc1. In this way, when the first count value L_CNT1 is obtained, it is possible to use a low reference frequency fref, and there is an advantage that precision of the count can be improved.

In addition, referring to FIG. 9, a second frequency-digital converter 702 has the same configuration and operation as the first frequency-digital converter 701 as described above, and may count a reference clock signal using a second oscillation signal LCosc2 as a reference clock signal to generate a second count value L_CNT2.

Figure 10:
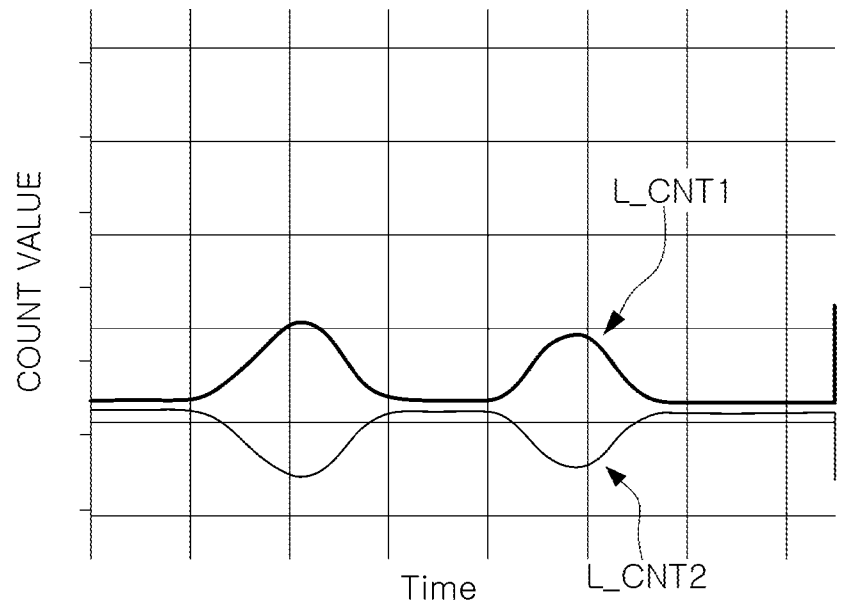
FIG. 10 is a graph of a first count value and a second count value when a force is applied to the first force member.
Figure 11:
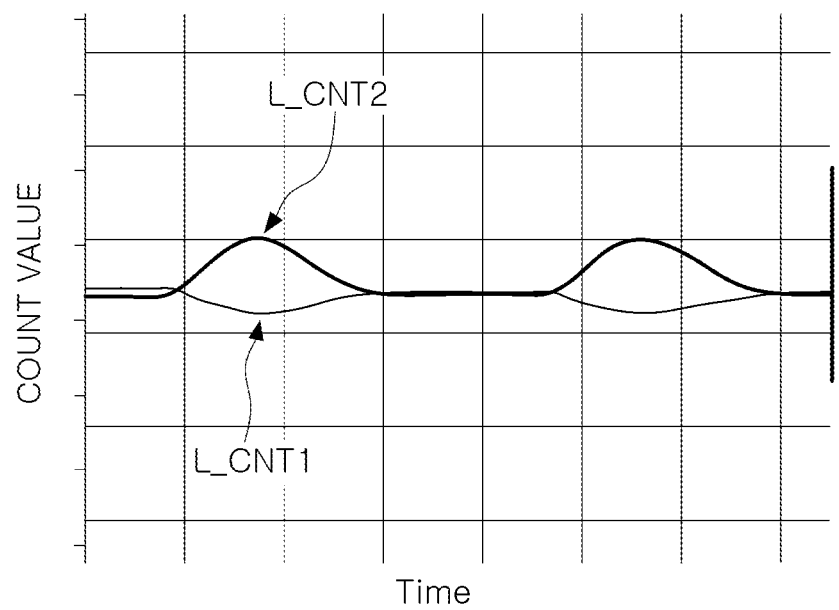
FIG. 11 is a graph of a first count value and a second count value when a force is applied to the second force member.
Figure 12:
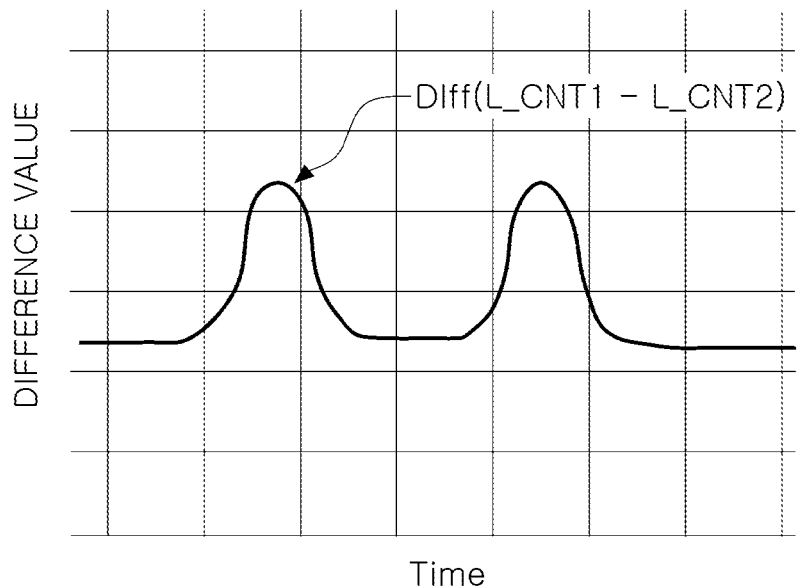
FIG. 12 is a graph of a difference value Diff between the first count value and the second count value when force is applied to the first force member.
Figure 13:
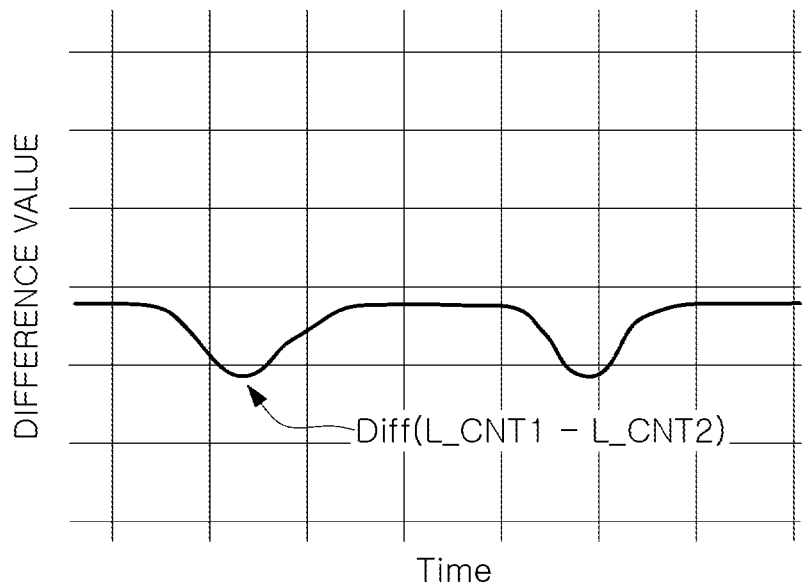
FIG. 13 is a graph of a difference value Diff between the first count value and the second count value when force is applied to the second force member.

FIG. 10 is a graph of a first count value and a second count value when force is applied to a first force member. FIG. 11 is a graph of a first count value and a second count value when force is applied to the second force member. FIG. 12 is a graph of a difference value Diff between the first count value and the second count value when force is applied to a first force member. FIG. 13 is a graph of a difference value Diff between the first count value and the second count value when force is applied to a second force member.

In FIG. 10, L_CNT1 is a first count value and L_CNT2 is a second count value.

Referring to FIG. 10, when force is applied to the first force member FM1, as shown in FIG. 10, the first count value L_CNT1 increases and the second count value L_CNT2 decreases based on a force application time point.

Referring to FIG. 11, when force is applied to the second force member FM2, as shown in FIG. 11, the second count value L_CNT2 increases and the first count value L_CNT1 decreases based on the time point of applying the force.

Referring to FIG. 12, when force is applied to the first force member FM1, as shown in FIG. 12, the difference value Diff between the first count value L_CNT1 and the second count value L_CNT2 increases to a positive value by a magnitude of an error between the first count value L_CNT1 and the second count value L_CNT2, based on the time point of applying the force.

As shown in FIG. 12, when force is applied to the first force member FM1, the difference value Diff becomes a positive value, larger than the first count value L_CNT1, thereby enabling more reliable detection.

Referring to FIG. 13, when force is applied to the second force member FM2, as shown in FIG. 13, the difference value Diff between the first count value L_CNT1 and the second count value L_CNT2 decreases to a negative value by a magnitude of an error between the first count value L_CNT1 and the second count value L_CNT2, based on the time point of applying the force.

As shown in FIG. 13, when force is applied to the second force member FM2, the difference value Diff becomes a negative value, smaller than the first count value L_CNT1, thereby enabling more reliable detection.

Figure 14:
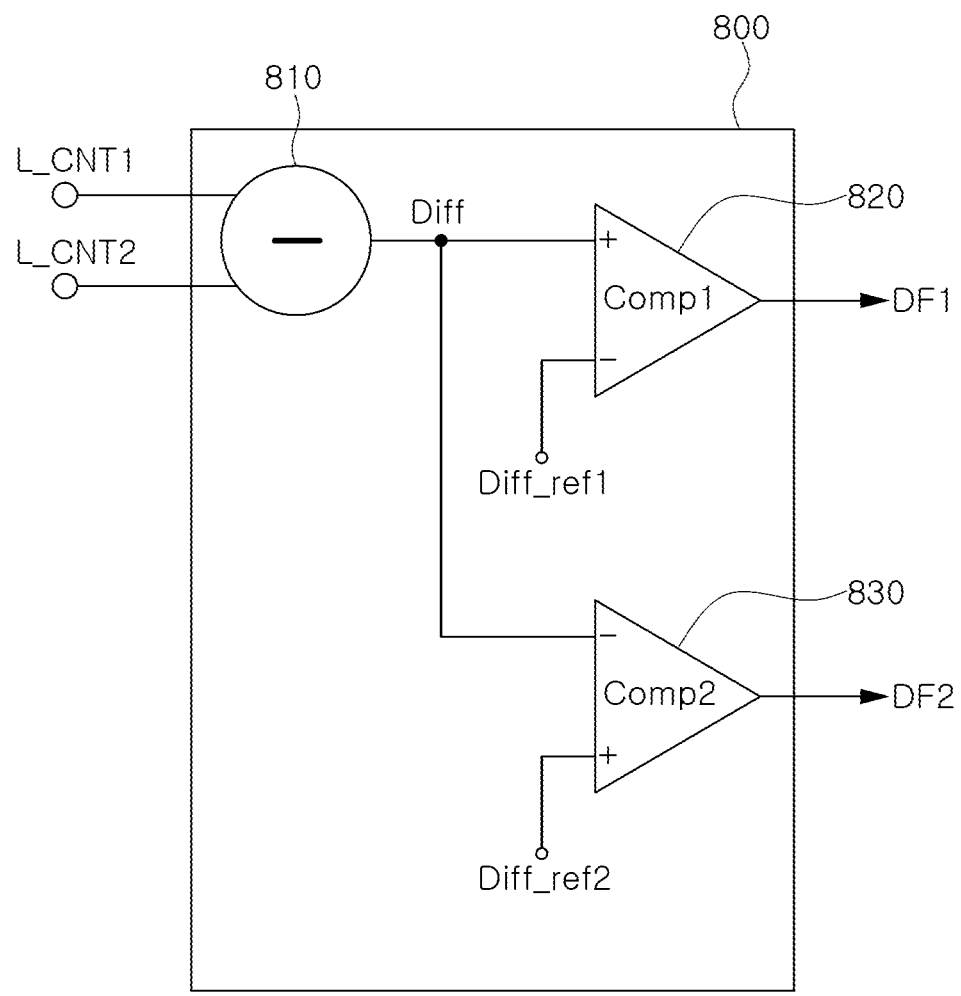
FIG. 14 is an exemplary diagram of the inner circuit of the force detection circuit of FIG. 7.

FIG. 14 is a diagram of the inner circuit of the force detection circuit 800 of FIG. 7.

Referring to FIG. 14, the force detection circuit 800 may include a subtractor 810, a first comparator 820, and a second comparator 830.

The subtractor 810 may subtract the first count value L_CNT1 and the second count value L_CNT2 to obtain a difference value Diff.

The first comparator 820 may compare the difference value Diff with a first reference value Diff_ref1. For example, when the difference value Diff is greater than the first reference value Diff_ref1, the first comparator 820 may output a first detection signal DF1 of a high level.

The second comparator 830 may compare the difference value Diff with a second reference value Diff_ref2. For example, if the difference value Diff is less than the second reference value Diff_ref2, the second comparator 830 may output a second detection signal DF2 of a high level.

When the above-described examples are applied to a mobile device, it is possible not only to recognize individual force inputs through at least two force members, but also to recognize slide force inputs, and accordingly, the force inputs can be utilized for various purposes.

As set forth above, according to various examples, in a force sensing device including two force members, when force is applied to any one of the two force members, it makes a resonant frequency by a force member to which the force is applied to be changed in a direction opposite to a resonant frequency by a force member to which the force is not applied, and thus force sensing discrimination force can be improved, and accordingly force sensing can be performed more accurately.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A force sensing device disposed in an electronic device having a first force member and a second force member formed on a conductive housing, the force sensing device comprising:
    a substrate disposed inside the housing and spaced apart from inner side surfaces of the first force member and the second force member;
    a first inductor element disposed on a first surface of the substrate and spaced apart from the first force member, the first inductor element having a first inductance, which is variable at a time of force input pressing the first force member;
    a second inductor element disposed on the first surface of the substrate and spaced apart from the second force member, the second inductor element having a second inductance, which is variable at a time of force input pressing the second force member; and
    a support member comprising a first end attached to the first surface of the substrate at a location between the first inductor element and the second inductor element and a second end attached to an inner side surface of the housing at a location between the first force member and the second force member.

2. The force sensing device of claim 1, wherein when force is input to any one of the first force member and the second force member, the first force member and the second force member move in opposite directions.

3. The force sensing device of claim 2, further comprising a first oscillation circuit configured to generate a first oscillation signal having a first resonance frequency based on the first inductance and a second oscillation circuit configured to generate a second oscillation signal having a second resonance frequency based on the second inductance.

4. The force sensing device of claim 3, wherein the first resonance frequency is higher than the second resonance frequency when force is applied to the first force member, and the second resonance frequency is higher than the first resonance frequency when force is applied to the second force member.

5. The force sensing device of claim 4, further comprising a detection circuit configured to:
    convert the first oscillation signal into a first digital value to generate a first count value and the second oscillation signal into a second digital value to generate a second count value,
    subtract the first count value and the second count value to obtain a difference value, and
    detect a force position based on the difference value to generate a detection signal.

6. The force sensing device of claim 5, wherein the detection circuit comprises:
    a first frequency-digital converter configured to convert the first oscillation signal into the first digital value to generate the first count value;
    a second frequency-digital converter configured to convert the second oscillation signal into the second digital value to generate the second count value; and
    a force detection circuit configured to obtain the difference value by subtracting the first count value and the second count value, and to detect the force position based on the difference value to generate the detection signal.

7. The force sensing device of claim 6, wherein the force detection circuit comprises:
   a subtractor configured to subtract the first count value and the second count value to obtain the difference value;
   a first comparator configured to compare the difference value with a first reference value; and
   a second comparator configured to compare the difference value with a second reference value.

8. The force sensing device of claim 7, further comprising a bracket supporting the substrate on a second surface of the substrate opposite the first surface to maintain a first distance between the first inductor element and the first force member and a second distance between the second inductor element and the second force member, in a state in which force is not applied to either the first force member or the second force member.

9. The force sensing device of claim 1, wherein when force is input to any one of the first force member and the second force member, the first force member and the second force member move in opposite directions by virtue of the support member.

10. An electronic device, comprising:
    a conductive housing;
    a force switch unit comprising a first force member and a second force member disposed on the housing;
    a substrate disposed inside the housing and spaced apart from inner side surfaces of the first force member and the second force member;
    a first inductor element disposed on a first surface of the substrate and spaced apart from the first force member, the first inductor element having a first inductance, which is variable at a time of force input pressing the first force member;
    a second inductor element disposed on the first surface of the substrate and spaced apart from the second force member, the second inductor element having a second inductance, which variable at a time of force input pressing the second force member; and
    a support member comprising a first end attached to the first surface of the substrate at a location between the first inductor element and the second inductor element and a second end attached to an inner side surface of the housing at a location between the first force member and the second force member.

11. The electronic device of claim 10, wherein the first force member and the second force member move in opposite directions, when force is input to any one of the first force member and the second force member.

12. The electronic device of claim 11, further comprising a first oscillation circuit configured to generate a first oscillation signal having a first resonance frequency based on the first inductance and a second oscillation circuit configured to generate a second oscillation signal having a second resonance frequency based on the second inductance.

13. The electronic device of claim 12, wherein the first resonance frequency is higher than the second resonance frequency when force is applied to the first force member, and the second resonance frequency is higher than the first resonance frequency when force is applied to the second force member.

14. The electronic device of claim 13, further comprising a detection circuit configured to:
    convert the first oscillation signal into a first digital value to generate a first count value and the second oscillation signal into a second digital value to generate a second count value, subtract the first count value and the second count value to obtain a difference value, and detect a force position based on the difference value to generate a detection signal.

15. The electronic device of claim 14, wherein the detection circuit comprises:
    a first frequency-digital converter configured to convert the first oscillation signal into the first digital value to generate the first count value;
    a second frequency-digital converter configured to convert the second oscillation signal into the second digital value to generate the second count value; and
    a force detection circuit configured to subtract the first count value and the second count value to obtain the difference value, and to detect the force position based on the difference value to generate the detection signal.

16. The electronic device of claim 15, wherein the force detection circuit comprises:
    a subtractor configured to subtract the first count value and the second count value to obtain the difference value;
    a first comparator configured to compare the difference value with a first reference value; and
    a second comparator configured to compare the difference value with a second reference value.

17. The electronic device of claim 16, further comprising a bracket supporting the substrate on a second surface of the substrate opposite the first surface to maintain a first distance between the first inductor element and the first force member and a second distance between the second inductor element and the second force member, in a state in which force is not applied to either the first force member or the second force member.

* * * * *